United States Patent
Kolze et al.

(10) Patent No.: US 9,049,058 B2
(45) Date of Patent: Jun. 2, 2015

(54) FINE STEP BLENDED MODULATION COMMUNICATIONS

(71) Applicant: BROADCOM CORPORATION, Irvine, CA (US)

(72) Inventors: Thomas J. Kolze, Phoenix, AZ (US); Bruce J. Currivan, Los Altos, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 14/071,883

(22) Filed: Nov. 5, 2013

(65) Prior Publication Data

US 2014/0177750 A1    Jun. 26, 2014

Related U.S. Application Data

(60) Provisional application No. 61/745,424, filed on Dec. 21, 2012, provisional application No. 61/751,765, filed on Jan. 11, 2013, provisional application No. 61/886,466, filed on Oct. 3, 2013.

(51) Int. Cl.
| | |
|---|---|
| *H04L 27/00* | (2006.01) |
| *H04L 27/34* | (2006.01) |
| *H04L 1/00* | (2006.01) |
| *H04L 1/24* | (2006.01) |
| *H04L 27/26* | (2006.01) |

(52) U.S. Cl.
CPC ......... *H04L 27/0008* (2013.01); *H04L 27/2604* (2013.01); *H04L 27/3488* (2013.01); *H04L 1/0003* (2013.01); *H04L 1/0009* (2013.01); *H04L 1/0015* (2013.01); *H04L 1/24* (2013.01)

(58) Field of Classification Search
CPC ... H04L 1/0003; H04L 1/0009; H04L 1/0025; H04L 27/0008; H04L 1/0041
See application file for complete search history.

(56) References Cited

U.S. PATENT DOCUMENTS

| 2007/0092012 A1* | 4/2007 | Wilhelmsson et al. | 375/260 |
| 2008/0267158 A1* | 10/2008 | Zhang et al. | 370/342 |
| 2009/0313528 A1* | 12/2009 | Chugg et al. | 714/758 |
| 2011/0286473 A1* | 11/2011 | Currivan et al. | 370/479 |
| 2013/0154755 A1* | 6/2013 | Eroz et al. | 332/144 |
| 2013/0279548 A1* | 10/2013 | Amanullah et al. | 375/219 |

* cited by examiner

*Primary Examiner* — Kenneth Lam
(74) *Attorney, Agent, or Firm* — Garlick & Markison; Shayne X. Short

(57) ABSTRACT

A communication device is configured to perform symbol mapping of bits to generate modulation symbols using one or more modulations. The device may employ a blended modulation composed of bit labels or symbols having different numbers of bits per symbol and different modulations. For example, the device may symbol map bit labels/symbols having first number of bits per symbol to first modulation, and the device may symbol map labels/symbols having second number of bits per symbol to second modulation. The device may be configured to perform forward error correction (FEC) or error correction code (ECC) and coding of information bits to generate coded bits that subsequently undergo symbol mapping. The device may be configured to operate based on different operational modes based on substantially uniform steps of rates, or bits per symbol, and energy per bit or symbol to noise spectral density ratio ($E_b/N_0$ or $E_s/N_0$).

20 Claims, 8 Drawing Sheets

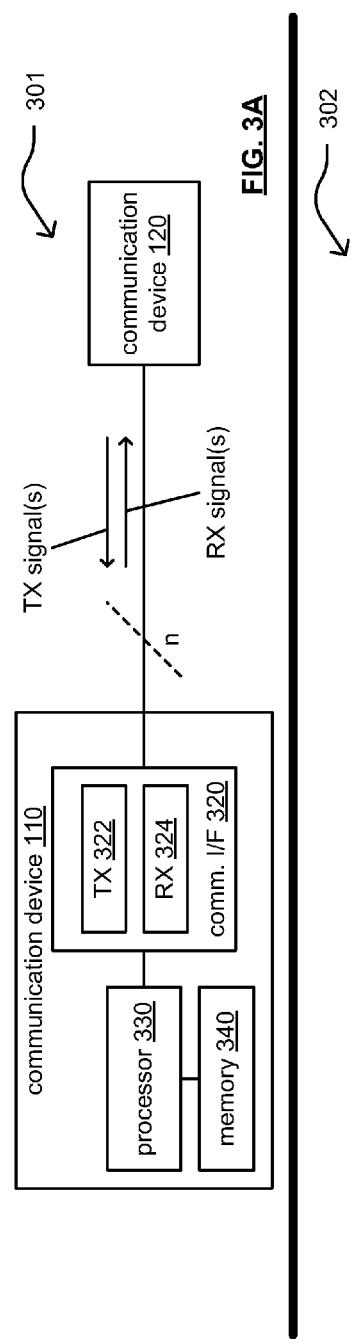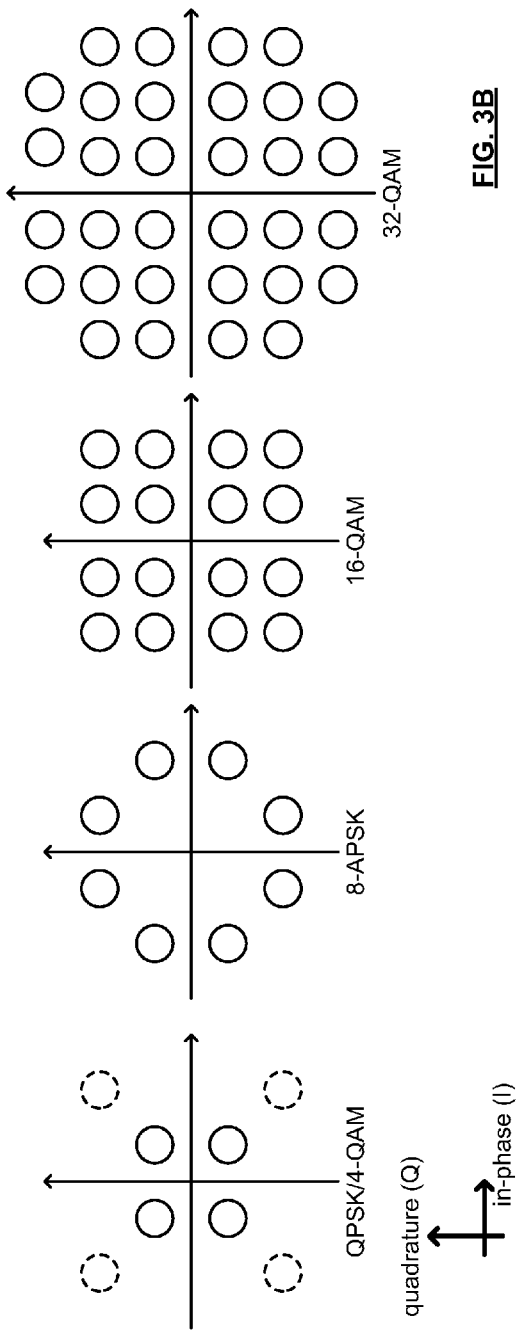

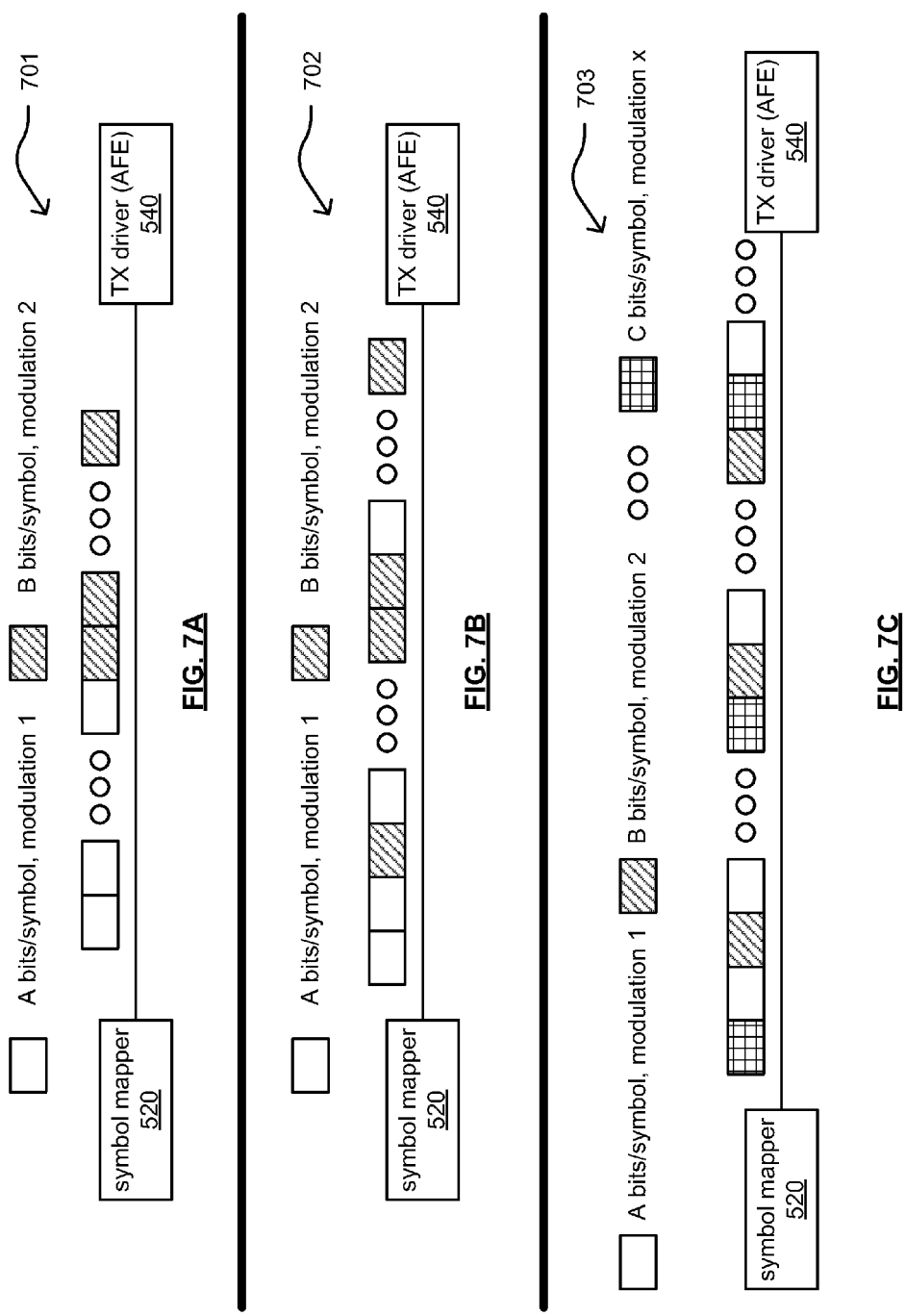

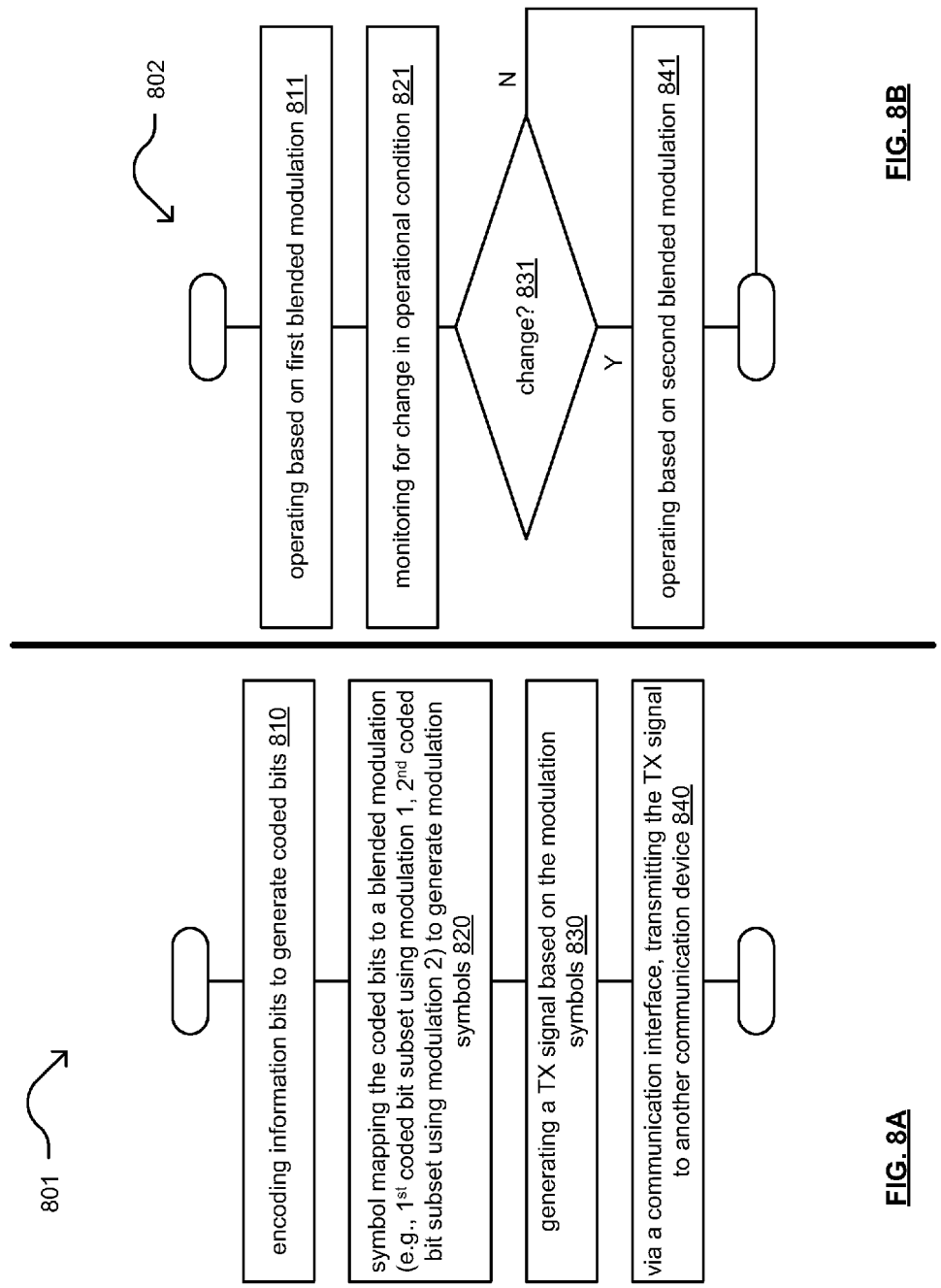

FINE STEP BLENDED MODULATION COMMUNICATIONS

CROSS REFERENCE TO RELATED PATENTS/PATENT APPLICATIONS

Provisional Priority Claims

The present U.S. Utility Patent Application claims priority pursuant to 35 U.S.C. §119(e) to the following U.S. Provisional Patent Applications which are hereby incorporated herein by reference in their entirety and made part of the present U.S. Utility Patent Application for all purposes:

1. U.S. Provisional Patent Application Ser. No. 61/745,424, entitled "Adjusting bits-per-symbol and required Es/No in fine steps," filed Dec. 21, 2012.

2. U.S. Provisional Patent Application Ser. No. 61/751,765, entitled "Adjusting bits-per-symbol and required Es/No in fine steps," filed Jan. 11, 2013.

3. U.S. Provisional Patent Application Ser. No. 61/886,466, entitled "Fine step blended modulation communications," filed Oct. 3, 2013.

BACKGROUND

1. Technical Field

The present disclosure relates generally to communication systems; and, more particularly, to modulation performed within such communication systems.

2. Description of Related Art

Data communication systems have been under continual development for many years. The primary goal within such communication systems is to transmit information successfully between devices. In some instances, a signal may undergo error correction code (ECC) or forward error correction (FEC) encoding and/or modulation in an effort to increase the amount of information that may be transmitted between devices via a communication channel. Typically, all of the symbols within a given signal or frame will have a common modulation (e.g., all of the symbols within a frame will be symbol mapped to a given constellation with a given mapping).

Some communication systems operate using more than one operational parameter. For example, certain communication standards, protocols, and/or recommended practices direct devices to operate differently at different times based on any of a number of different criteria. Current technologies do not offer the ability to switch between different modes of operation with very fine degrees of granularity. Typically, there is a significant amount of differentiation between the performance or throughput that may be achieved in a communication system when operating at different modes.

BRIEF DESCRIPTION OF THE SEVERAL VIEWS OF THE DRAWINGS

FIG. 3A is a diagram illustrating at least one communication device operative within one or more communication systems.

FIG. 3B is a diagram illustrating an example of various modulations that may be used in one or more blended modulations.

FIG. 7A is a diagram illustrating an example of a sequence of discrete-valued modulation symbols.

FIG. 7B is a diagram illustrating an example of a sequence of discrete-valued modulation symbols.

FIG. 7C is a diagram illustrating an example of a sequence of discrete-valued modulation symbols.

FIG. 8A is a diagram illustrating an embodiment of a method for execution by one or more communication devices.

FIG. 8B is a diagram illustrating another embodiment of a method for execution by one or more communication devices.

DETAILED DESCRIPTION

Figure 1:
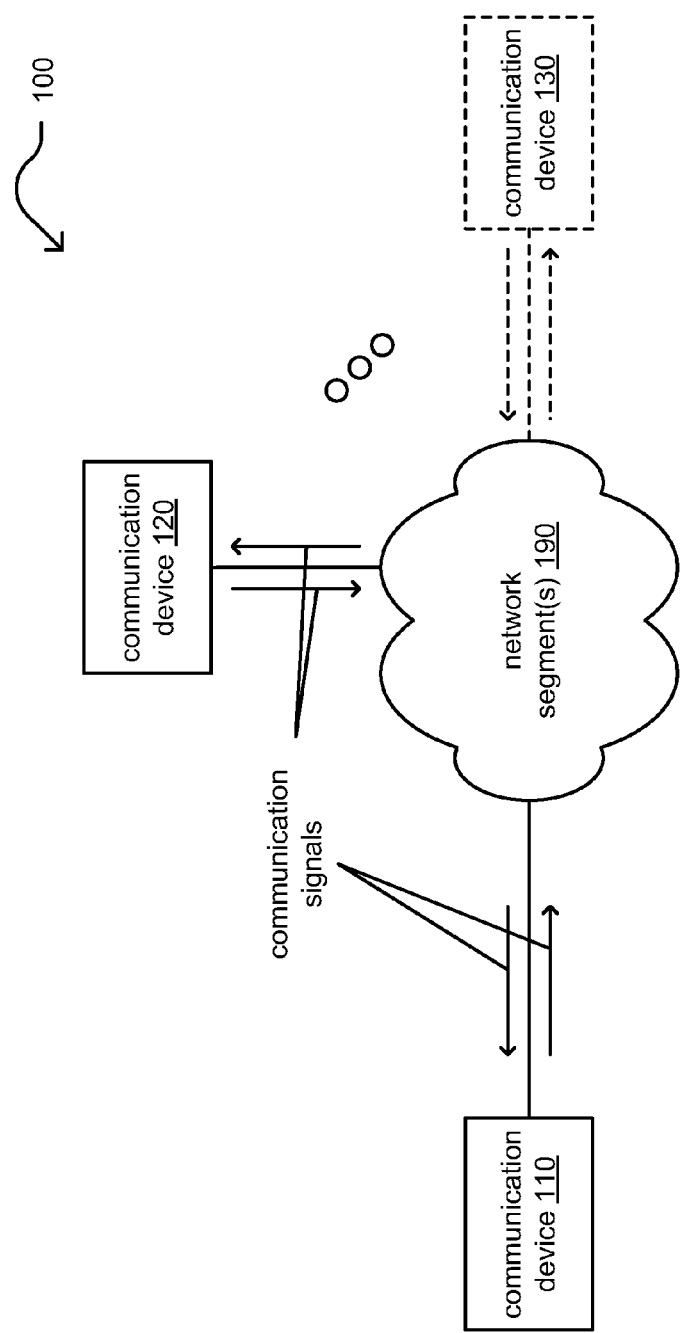
FIG. 1 is a diagram illustrating an embodiment of one or more communication systems.

FIG. 1 is a diagram illustrating an embodiment 100 of one or more communication systems. One or more network segments 190 provide communication inter-connectivity for at least two communication devices 110 and 120. Generally speaking, any desired number of communication devices are included within one or more communication systems (e.g., as shown by communication device 130). Some or all the various communication devices 110-130 include capability to operate using fine step blended modulation communications as described herein.

The various communication links within the one or more network segments 190 may be implemented using any of a variety of communication media including communication links implemented as wireless, wired, optical, satellite, microwave, etc. communication links. Also, in some instances, communication links of different types may cooperatively form a connection pathway between any two communication devices. Considering one possible example, a communication pathway between devices 110 and 120 may include some segments of wired communication links and other segments of optical communication links. Note also that the devices 110-130 may be of a variety of types of devices including stationary devices, mobile devices, portable devices, etc. and may support communications for any of a number of services or service flows including data, telephony, television, Internet, media, synchronization, etc.

In an example of operation, device 110 includes a communication interface to support communications with one or more of the other devices 120-130. This communication may be bidirectional/to and from the one or more of the other devices 120-130 or unidirectional (or primarily unidirectional) from the one or more of the other devices 120-130.

In an example of operation, device 110 is configured to perform symbol mapping of bits to generate modulation symbols using any one or more modulations selected from a group of modulations. Two or more modulations may be selected to form a blended modulation for a given group of bits. A blended modulation is a combination of two or more modulations. For example, a first blended modulation may operate to generate modulation symbols including one or more modulation symbols generated using a first modulation and one or more modulation symbols generated using a second modulation. A second blended modulation may operate to generate modulation symbols including one or more modulation symbols generated using the first modulation and one or more modulation symbols generated using a third modulation. The modulation symbols generated using the first, the second, and/or the third (and/or even more) modulations may be in arranged any desired order.

The bits that undergo symbol mapping may be uncoded bits, or may be generated using any desired form of forward error correction (FEC) and/or error correction code (ECC) coding (e.g., convolutional, turbo, turbo trellis coded modulation (TTCM), low density parity check (LDPC), Reed-Solomon (RS), BCH (Bose and Ray-Chaudhuri, and Hocquenghem), etc. and/or any combination of two or more types of coding).

The device 110 is configured to operate using any of a number of rates, or bits per symbol, and energy per bit or symbol to noise spectral density ratio ($E_b/N_0$ or $E_s/N_0$). For example, the device 110 can operate based on a number of operational points that are relatively close to one another, with any desired granularity including fine granularity, using different rates, or bits per symbol, and $E_b/N_0$ or $E_s/N_0$. These various operational points can correspond to different blended modulations that have the different rates, or bits per symbol, and $E_b/N_0$ or $E_s/N_0$. These various modulations are spaced by substantially uniform steps of bits per symbol and energy per bit or symbol to noise spectral density ratio ($E_b/N_0$ or $E_s/N_0$).

In some instances, the device 110 includes a processor configured to encode input bits using a singular selected FEC or ECC is used to generate coded bits. Then, the processor of the device 110 is configured to perform symbol mapping of those coded bits using anyone modulation selected from a number of modulations to generate modulation symbols. The device 110 also includes a communication interface configured to transmit a signal based on those modulation symbols to one or more other communication device via one or more communication channels.

In other instances, the device 110 includes a processor configured to employ any selected FEC or ECC, from more than one FEC or ECC, to generate coded bits. Then, the device 110 perform symbol mapping of these coded bits to generate modulation symbols, and the communication interface of the device 110 is configured to transmit a signal based on those modulation symbols to one or more other communication device via one or more communication channels.

Figure 2:
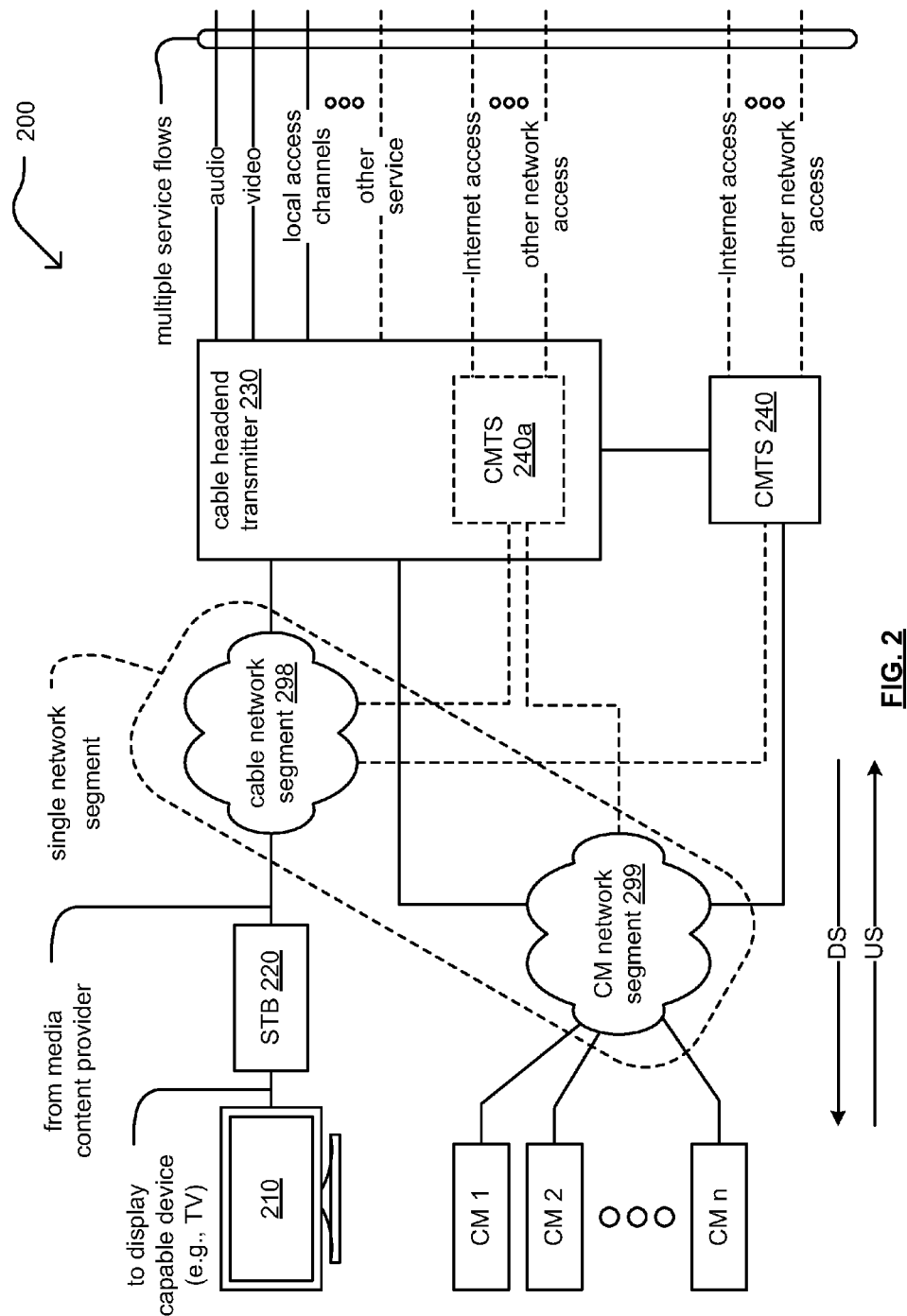
FIG. 2 is a diagram illustrating another embodiment of one or more communication systems.

FIG. 2 is a diagram illustrating another embodiment 200 of one or more communication systems. A cable headend transmitter 230 provides service to a set-top box (STB) 220 via cable network segment 298. The STB 220 provides output to a display capable device 210. The cable headend transmitter 230 can support any of a number of service flows such as audio, video, local access channels, as well as any other service of cable systems. For example, the cable headend transmitter 230 can provide media (e.g., video and/or audio) to the display capable device.

The cable headend transmitter 230 may provide operation of a cable modem termination system (CMTS) 240a. For example, the cable headend transmitter 230 may perform such CMTS functionality, or a CMTS may be implemented separately from the cable headend transmitter 230 (e.g., as shown by reference numeral 240). The CMTS 240 can provide network service (e.g., Internet, other network access, etc.) to any number of cable modems (shown as CM 1, CM 2, and up to CM n) via a cable modem (CM) network segment 299. The cable network segment 298 and the CM network segment 299 may be part of a common network or common networks. The cable modem network segment 299 couples the cable modems 1-n to the CMTS (shown as 240 or 240a). Such a cable system (e.g., cable network segment 298 and/or CM network segment 299) may generally be referred to as a cable plant and may be implemented, at least in part, as a hybrid fiber-coaxial (HFC) network (e.g., including various wired and/or optical fiber communication segments, light sources, light or photo detection complements, etc.).

A CMTS 240 (or 240a) is a component that exchanges digital signals with cable modems 1-n on the cable modem network segment 299. Each of the cable modems is coupled to the cable modem network segment 299, and a number of elements may be included within the cable modem network segment 299. For example, routers, splitters, couplers, relays, and amplifiers may be contained within the cable modem network segment 299. Generally speaking, downstream information may be viewed as that which flows from the CMTS 240 to the connected cable modems (e.g., CM 1, CM2, etc.), and upstream information as that which flows from the cable modems to the CMTS 240.

At least some of the devices within the communication system are configured to perform symbol mapping of bits to generate modulation symbols using any modulation selected from a number of modulations that are spaced by substantially uniform steps of bits per symbol and energy per bit or symbol to noise spectral density ratio ($E_b/N_0$ or $E_s/N_0$). In an example of operation, the CMTS 240 (or 240a) is configured to transmit a signal to one of the cable modems (CM 1). The CMTS 240 (or 240a) may adaptively select any desired modulation from a group of modulations to achieve a desired rate, or bits per symbol and $E_b/N_0$ or $E_s/N_0$. The CMTS 240 (or 240a) may operate using a first desired rate, or first desired bits per symbol and $E_b/N_0$ or $E_s/N_0$ at a first time, and may operate using a second desired rate, or second desired bits per symbol and $E_b/N_0$ or $E_s/N_0$ at a second time. Similarly, any one or more of the other devices within the system, such as CM 1 may be configured to operate using anyone of the modulations as well as adapt operation between different modulations at different times.

FIG. 3A is a diagram 301 illustrating at least one communication device 110 operative within one or more communication systems. The device 110 includes a communication interface 320 and a processor 330. The communication interface 320 includes functionality of a transmitter 322 and the receiver 324 to support communications with one or more other devices within a communication system (e.g., communication device 120). The device 110 may also include memory 340 to store information including one or more modulations, any desired combination of modulations such as blended modulations, mapping of constellation points associated with a modulation, etc. Also, the memory 340 may be configured to store information received from one or more other devices (e.g., communication device 120) via one or more communication channels.

The processor 330 is configured to perform symbol mapping of bits to generate modulation symbols for transmission to one or more other communication devices (e.g., communication device 120) via one or more communication channels. The processor 330 may adapt between different operational modes associated with different rates, or bits per symbol, and $E_b/N_0$ or $E_s/N_0$ based on any one or more desired factors. For example, the processor 330 may have a predetermined schedule by which operation is switch between different modes. Alternatively, the processor 330 may adapt operation based on one or more local operating conditions of device 110 (e.g., available processing resources, historical operation, expected or anticipated future operation, etc.). In even other examples, the processor 330 may adapt operation based on one or more remote operating conditions of another device within the system or one or more communication channels of the system. For example, the communication interface 320 may receive one or more signals from one or more other devices within the system indicating one or more remote operating conditions, and the processor 330 may adapt operation based on that received information.

Also, the processor 330 may be configured to perform encoding using any one or more desired FECs and/or ECCs to generate coded bits subsequently to undergo symbol mapping using one or more modulations. In one implementation, the processor 330 can employ one a singular FEC or ECC to generate coded bits, and then adaptively perform symbol mapping of different groups of coded bits to achieve operation across two or more operational modes. Alternatively, in another implementation, the processor 330 can adaptively select any FEC or ECC from a group of FEC's or ECC's as well as adaptively select any modulation from a group of modulations to achieve operation across two or more operational modes.

FIG. 3B is a diagram illustrating an example 302 of various modulations that may be used in one or more blended modulations. From left to right, different modulations are shown based on different sized symbols. Quadrature phase shift keying (QPSK) or 4-quadrature amplitude modulation (QAM) includes 4 constellation points located respectively within the four quadrants of a constellation with axes of in-phase (horizontal) and quadrature (vertical). Each constellation point corresponds to a given 2-bit label or 2-bit symbol (e.g., a first constellation point associated with symbol value 00, a second constellation point associated with symbol value 01, a third constellation point associated with symbol value 10, and fourth constellation point associated with symbol value 11). In some instances, the four constellation points of QPSK or 4-QAM are merely a subset of constellation points associated with a higher ordered modulation that includes more than one constellation point in each quadrant. For example, one constellation point may be selected within each quadrant based on a higher ordered modulation.

8-phase shift keying (PSK) includes 8 constellation points, and each constellation point corresponds to a respective 3-bit label or 3-bit symbol (e.g., 000, 001, 010, and so on up to 111).

16-QAM includes 16 constellation points, and each constellation point corresponds to a respective 4-bit label or 4-bit symbol (e.g., 0000, 0001, 0010, and so on up to 1111).

32-QAM includes 32 constellation points, and each constellation point corresponds to a respective 5-bit label or 5-bit symbol (e.g., 00000, 0001, 00010, and so on up to 11111).

Other higher ordered modulations may also be employed, such as 64-QAM, 128-QAM, 256-QAM, etc. and/or even higher ordered modulations including larger numbers of constellation points. Note also that different shaped constellations may be used for bit labels or symbols of a given size. As an example, another option for a modulation based on 5-bit labels or 5-bit symbols is 32 amplitude and phase shift keying (APSK) (e.g., two concentric circles of modulation points, such as an outer ring of modulation points encircling the constellation points of an 8-PSK modulation, for total of 32 constellation points within the modulation).

Note also that a given modulation has both a number of constellation points and associated mapping of the constellation points themselves (e.g., a respective bit label for each constellation point). Note that the mapping associated with a modulation may vary as a function of time. That is to say, the constellation points of the given modulation may have a first mapping at a first time, and a second mapping a second time. This can provide for yet another degree of freedom and flexibility to adapt to different operational modes.

The modulations referenced here is not an exhaustive list of all possible modulations known, and the reader will understand that any desired modulation type, mapping, shape, etc. may be employed in certain embodiments.

Figures 4A, 4B:
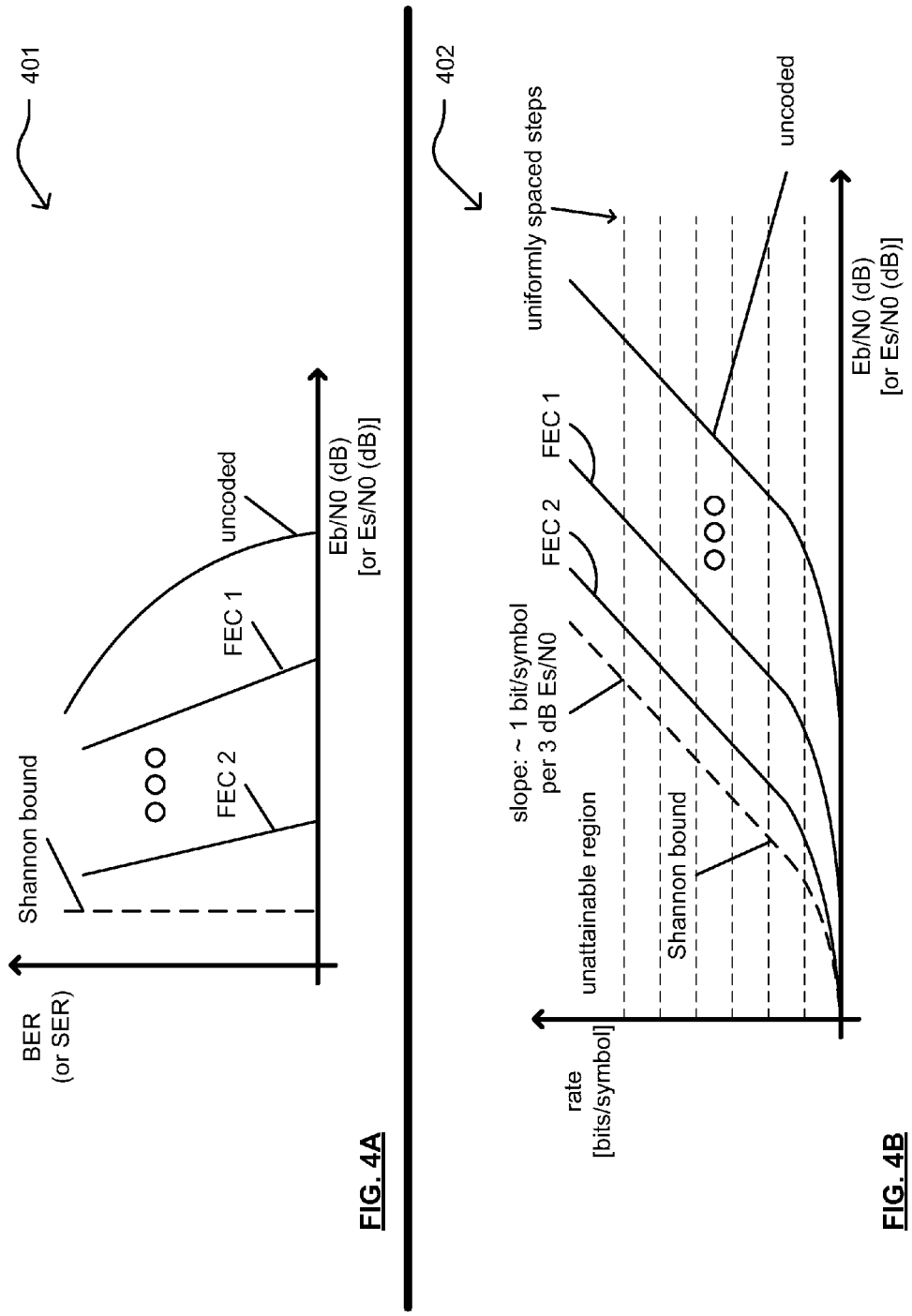
FIG. 4A is a diagram illustrating an example of a performance diagram showing bit error rate (BER) or symbol error rate (SER) as a function of energy per bit or symbol to noise spectral density ratio ($E_b/N_0$ or $E_s/N_0$).
FIG. 4B is a diagram illustrating an example of a performance diagram showing rate (bits per symbol) as a function of energy per bit or symbol to noise spectral density ratio ($E_b/N_0$ or $E_s/N_0$).

FIG. 4A is a diagram illustrating an example 401 of a performance diagram showing bit error rate (BER) or symbol error rate (SER) as a function of energy per bit or symbol to noise spectral density ratio ($E_b/N_0$ or $E_s/N_0$). Some background information on these measurements is provided for the convenience of the reader.

$E_b/N_0$ (the energy per bit to noise power spectral density ratio) is a parameter employed to characterize in digital communication or data transmission. It is a normalized measure of signal to noise ratio (SNR), also known as the "SNR per bit". This parameter may be used to compare the bit error rate (BER) performance of different digital modulation schemes without taking bandwidth into account.

$E_b/N_0$ is equal to the SNR divided by the overall communication's links spectral efficiency in (bit/s)/Hz, where the bits in this context are transmitted data bits, inclusive of error correction information and other protocol overhead. When forward error correction (FEC) is being discussed, $E_b/N_0$ may be used to refer to the energy per information bit (e.g., the energy per bit net of FEC overhead bits); in this context, $E_s/N_0$ is generally used to relate actual transmitted power to noise.

The noise spectral density $N_0$ is usually expressed in units of watts per hertz and can also be seen as having dimensions of energy, or units of joules, or joules per cycle. $E_s/N_0$ is therefore a non-dimensional ratio.

$E_b/N_0$ is commonly used with modulation and coding designed for noise-limited rather than interference-limited communication, since additive white noise (with constant noise density $N_0$) is assumed.

The Shannon limit or Shannon bound is maximum rate at which error-free digital communication may be made via a communication channel. This limit or bound of a communication channel is the theoretical maximum information transfer rate of the channel for a given noise level. Uncoded modulation is relatively far from the Shannon bound, while different types of forward error correction (FEC) or error correction code (ECC) allow for performance to approach the Shannon bound.

FIG. 4B is a diagram illustrating an example 402 of a performance diagram showing rate (bits per symbol) as a function of energy per bit or symbol to noise spectral density ratio ($E_b/N_0$ or $E_s/N_0$). Performance of the communication system may be viewed from another perspective. The rate, or bits per symbol, of communications may be mapped versus $E_b/N_0$ or $E_s/N_0$ as in this diagram. Again, the Shannon bound is shown as being that theoretical limit beyond which communications may not be achieved, and the area above and to the left of the Shannon bound may be described as an unattainable region. However, for a given FEC or ECC, performance may approach the Shannon bound, and the slope of the performance line will approach approximately 1 bit/symbol per 3 dB $E_s/N_0$. For a given FEC or ECC, a communication device may be configured to adapt its operation up and down a given performance curve. When multiple FEC's or ECC's may be employed, then a device may be configured to adapt its operation based on both FEC or ECC and rate.

Considering example of operation, for a given FEC, a device may be configured to perform symbol mapping of bit to generate modulation symbols based on any desired rate and energy per bit or symbol to noise spectral density ratio ($E_b/N_0$ or $E_s/N_0$). Different operational modes may correspond to different rates and different $E_b/N_0$ or $E_s/N_0$. A device may operate between different operational modes that are separated by very fine granularity, and the different operational modes may be spaced apart by substantially uniform steps (shown as uniformly spaced steps in the diagram, which can be spaced at any desired interval or spacing). A device can switch between operational modes of different modulations or blended modulations that have different respective numbers of bits per symbol and $E_b/N_0$ or $E_s/N_0$. For example, a device can operate using a first blended modulation having a first number of bits per symbol and a first $E_b/N_0$ or a first $E_s/N$ at or during a first time, and then the device can operate using a second blended modulation having a second number of bits per symbol and a second $E_b/N_0$ or a second $E_s/N$ at or during a second time. Generally, a device can switch between any desired number (e.g., n, where n is any desired positive integer greater than or equal to 2) of operational modes of different modulations or blended modulations.

A communication device can be configured to employ a FEC or ECC coding scheme for a first modulation (e.g., a B bit per symbol constellation), and also a second modulation (e.g., for a B+1 bit per symbol constellation, or B+2 bit per symbol constellation, or even constellations with higher numbers of bits), with coding that is approximately at a rate of "r". This rate, r, corresponds to a modulation (combined FEC/modulation scheme) that requires roughly 3r dB (or 6r dB) higher Es/No to satisfy a targeted error performance (e.g., bit error rate (BER) or symbol error rate (SER).

In some application, the coarseness of this step (e.g., 3r dB (or 6r dB)) is larger than may be desirable. For example, steps of 1 dB may be desirable in some applications to allow for operation based on different operational modes. In one example, if r=0.9, then steps in many cases are approximately 2.7 dB (or 5.4 dB). In another example, if r=0.75, steps are in many cases approximately 2.25 dB (or 4.5 dB).

A communication device may be configured to employ a combined FEC scheme from the base scheme, with relatively finer steps that can be approximately uniformly spaced apart (e.g., 1 dB, or even 0.5 dB steps), to achieve nearly the highest possible effective bits per symbol rate through a communication link. A communication device may be configured to operate at intermediary bits per symbol values including between two existing FEC schemes for fixed constellation. This may be tailored to match closely the available Es/No, as opposed than falling up to r (or 2r) bits per symbol short of the highest possible effective rate due to the coarseness of other FEC/modulation schemes. Some implementations may be implemented to limit to the integer constellation sizes (e.g., such as limited to constellation sizes or types with only even or odd bit labels or symbols).

Consider a communication device configured to employ a FEC and modulation scheme for a constellation with bit labels or symbols of B bits per symbol, and requiring X Es/No (dB) for a targeted error performance, and with an effective (information) rate of rB bits per symbol (where r=code rate of the FEC scheme). Then, the communication device may adaptively be configured to use the same FEC and modulation scheme for a constellation with bit labels or symbols of B+1 (or B+2) bits per symbol, and the communication device can provide roughly X+3r dB Es/No (or roughly X+6r dB Es/No). When the communication device is configured to operate the FEC and modulation scheme with a proportion of symbols carrying the codeword bits (e.g., 1−p of them), and using B bits per symbol, the remaining proportion of symbols can carry the remaining codeword bits (e.g., the remaining p of them), using B+1 (or B+2) bits per symbol. This provides a FEC and modulation scheme that can operate at a rate of B+p (or B+2p) bits per symbol, and with an effective information rate of approximately r [B+p] bits/symbol (or approximately r [B+2p] bits/symbol). This FEC and modulation scheme can then meet a targeted error performance at roughly Es/No (dB)=X+3rp, (or Es/No dB)=X+6rp).

Also, such a FEC and modulation scheme can operate at rB+rp effective bits/symbol for set partitioned coded modulation with low density parity check (LDPC) FEC on some numbers of least significant bits (LSBs) per QAM symbol. This can also operate for codes derived from such a base FEC code with varying number of additional non-LDPC-coded bits per QAM symbol. These additional non-LDPC-coded bits may be coded (e.g., using another ECC or FEC, such as by an additional outer code) or they may be uncoded. When employed, an additional outer code may operate on the LDPC coded bits in some instances.

An outer coding may be applied to fit the number of total bits, and it can vary from a minimum number (when using a modulation of B bits per symbol) to a maximum number (when the constellation is B+1 (or B+2) bits per symbol). Shortening of an outer code may be performed used to reduce from the maximum number. For such a FEC and modulation scheme with B+p (or B+2p) bits per constellation symbol (on average), the outer code may be shortened accordingly from the maximum number.

Also, note that a communication device may be configured to vary (e.g., change, modulate, modify, etc.) the transmit power along with a variation in bit loading (e.g., numbers of bits per symbol). This may be performed in combination with, or separately from varying the bit loading. For example, a mixed mode application have relatively worse signal to noise ratio (SNR) performance by approximately 0.3-0.4 dB compared to the midpoint between the two surrounding square-quadrature amplitude modulation (QAM) curves. This is because the ECC or FEC is expected compensate for a worse symbol error rate (SER) on the higher QAM mode. In general, two respective curves may be mixed or combined together (e.g., one with relatively low SER and one with relatively much higher SER). The resulting SER average is then relatively lower compared to the signal to noise ratio (SNR) average due to any nonlinearly of the SER-vs-SNR curve (e.g., as in FIG. 4A).

A communication device may be configured to employ two or more modulations that may be adjusted in terms of or as a function of power such that the resulting SERs are then equal. This can mitigate or eliminate completely and the mixed-QAM curve then lies midway between the two surrounding square-QAM curves. In some embodiments, this power adjustment can be approximately ±1.5 dB for the two respective modulations (e.g., an FEC and modulation scheme that uses a first modulation with B bits per symbol constellation, and also a second modulation with B+1 bits per symbol constellation, or B+2 bits per symbol constellation, or even modulations with higher numbers of bits per symbol)). Also, when using OFDM, odd and even subcarriers may be implemented to have slightly different power levels. Generally, if odd and even sub-carriers have different modulation order (e.g., different numbers of bits per symbol), they will also have different power levels, such as +1.5 dB for even and −1.5 dB for odd carriers.

Figures 5A, 5B:
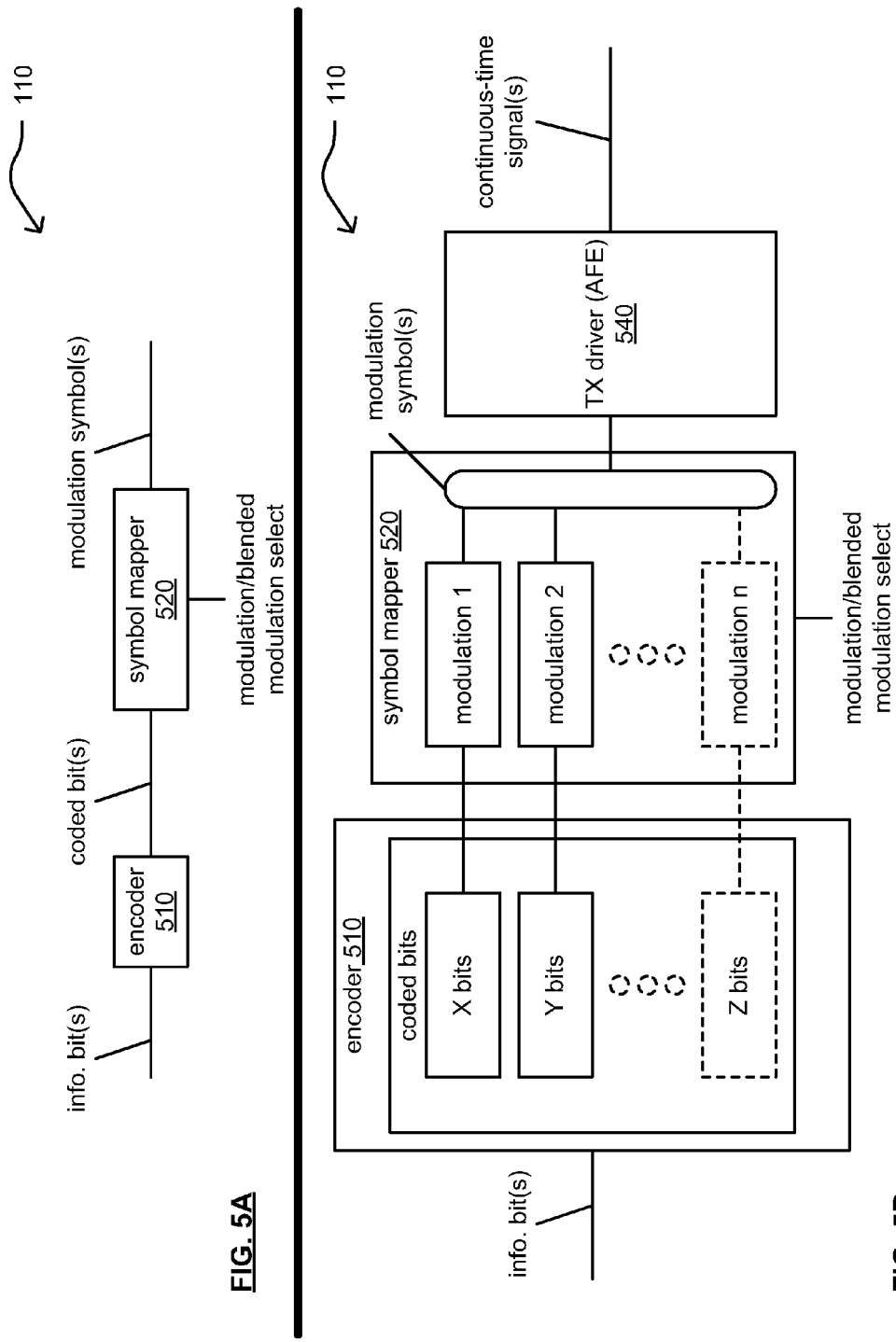
FIG. 5A is a diagram illustrating an example of a communication device.
FIG. 5B is a diagram illustrating another example of a communication device.

FIG. 5A is a diagram illustrating an example of a communication device 110. In this example, the device 110 includes an encoder 510 configured to encode one or more information bit to generate coded bits. The device 110 also includes a symbol mapper 520 configured to symbol map the coded bits to one or more modulations to generate modulation symbols. The device 110 may provide a select signal to the symbol mapper 522 direct which one or more modulations to employ to generate the modulation symbols. The select signal may be based on information generated by the device 110 and/or information provided or received from another device within the system.

The device 110 may adapt operation between different modulations at different times. In one example of operation, the symbol mapper 520 may operate using a first modulation at a first time, and the symbol mapper 520 may operate using a second modulation at a second time. One or both of the first and second modulations may be blended modulations such that they are composed of some combination of two or more modulations. As an example, considering a certain number of coded bits, a first group of those coded bits may undergo processing based on the first modulation to generate first modulation symbols, and the second group of those coded bits may undergo processing based on the second modulation to generate second modulation symbols. The first and second modulation symbols may be included within a singular frame to be transmitted to another device. The symbol mapper 520 may generate any desired blending of modulation symbols based on two or more modulations. These two or more modulations may include bit labels or symbols of different numbers of bits (e.g., the first modulation could include 3 bit labels or symbols, and the second modulation could include 4 bit labels or symbols).

Note also that other examples of the device 110 may include an encoder 510 that also operates based on selectivity, such as among two or more FEC's or ECC's. The device 110 is configured to operate using any of a number of operational modes based on selectivity between one or more FEC's or ECC's and two or more modulations. A FIG. 5B is a diagram illustrating another example of a communication device 110. In this example, the device 110 includes an encoder 510 configured to encode one or more information bit to generate coded bits. The device 110 also includes a symbol mapper 520 configured to symbol map the coded bits to one or more modulations to generate modulation symbols. The device 110 also includes a transmit driver (TX) 540 configured to combine the modulation symbols to generate one or more continuous-time signals for transmission to one or more other devices via one or more communication channels.

The encoder 510 is configured to generate coded bits that are partitioned into different respective groups. A first group may include bit labels or symbols of X bits each, and a second group may include bit labels or symbols of Y bits each. In general, the coded bits may be partitioned into any desired number of different groups based on bid-labels are symbols of different numbers of bits each (e.g., X bits, Y, bits, etc. and/or Z bits).

The symbol mapper 520 is configured to employ a first modulation to symbol map those bit labels or symbols having the first number of bit labels or symbols (e.g., X bits each) and is configured to employ a second modulation to symbol map those bit labels or symbols having the second number of bit labels or symbols (e.g., Y bits each). In some applications, more than two different modulations and/or more than two different groups of bit label sizes or symbol sizes are employed.

Modulation symbols based on the first and second modulations are then provided to the transmit driver (TX) 540. The transmit driver (TX) 540 perform those operations associated with them analog front end (AFE) of a communication device to generate a continuous-time signal for transmission via a communication. Some examples of such AFE related operations may include digital to analog conversion, frequency conversion such up-conversion, gain adjustment, filtering, etc.

In this example as well, the device 110 may adapt operation between different modulations at different times. In one example of operation, the symbol mapper 520 may operate using a first modulation at a first time, and the symbol mapper 520 may operate using a second modulation at a second time.

Various examples of symbol mapping operation are provided in the following four diagrams.

Figures 6A, 6B, 6C, 6D:
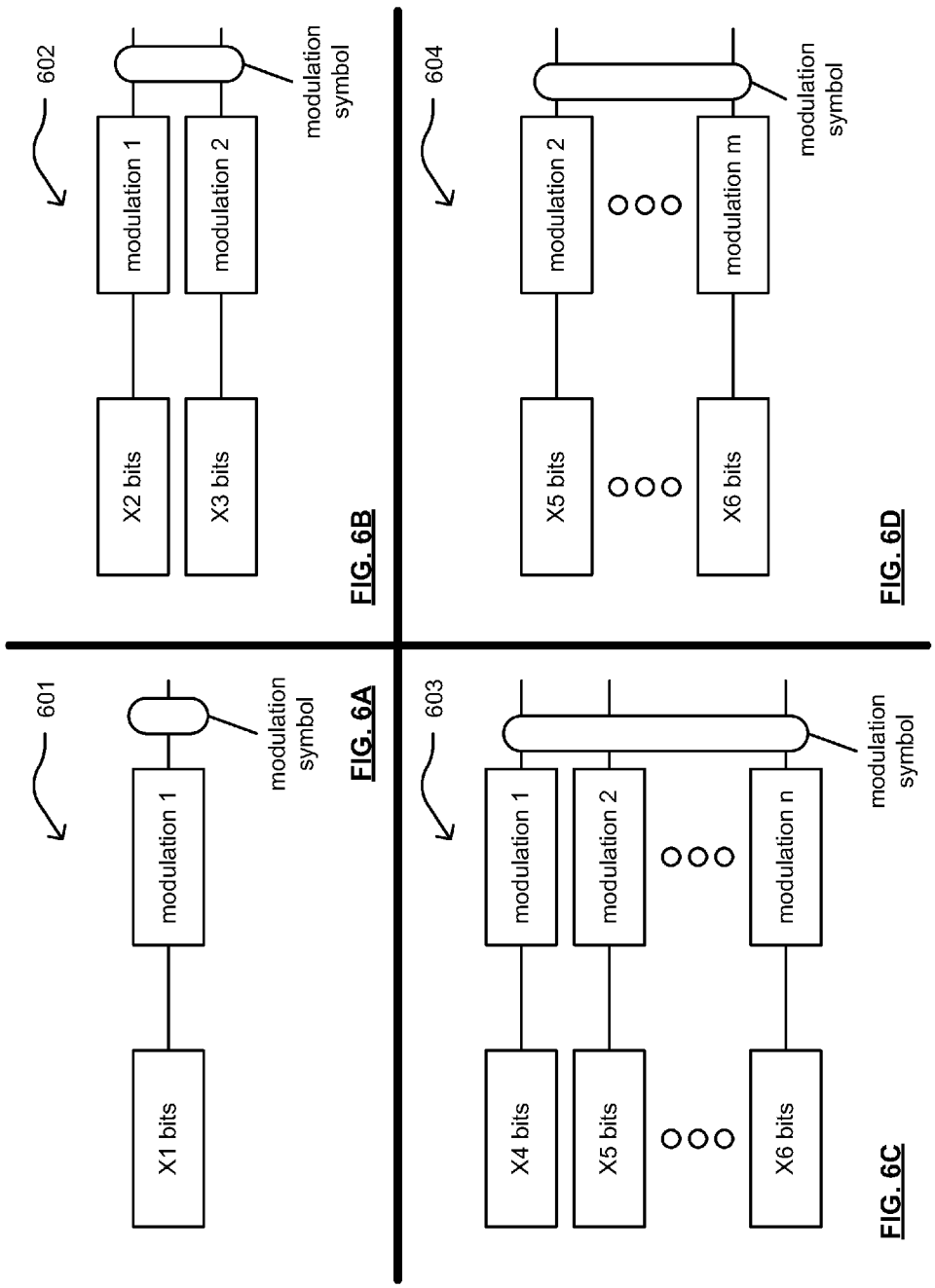
FIG. 6A is a diagram illustrating an example of a modulation selected from one or more modulations.
FIG. 6B is a diagram illustrating another example of a modulation selected from one or more modulations.
FIG. 6C is a diagram illustrating another example of a modulation selected from one or more modulations.
FIG. 6D is a diagram illustrating another example of a modulation selected from one or more modulations.

FIG. 6A is a diagram illustrating an example 601 of a modulation selected from one or more modulations. This example 601 shows a group of bits partitioned into bit labels or symbols each having a common number of bits (e.g., X1 bits per symbol or bit label). These bit labels or symbols undergo symbol mapping using one modulation.

FIG. 6B is a diagram illustrating another example 602 of a modulation selected from one or more modulations. This example 602 shows two group of bits partitioned into bit labels or symbols having two different numbers of bits (e.g., X2 and X3 bits per symbol or bit label). Those bit labels or symbols having X2 bits per symbol or bit label undergo symbol mapping using a first modulation, and those bit labels or symbols having X3 bits per symbol or bit label undergo symbol mapping using a second modulation.

FIG. 6C is a diagram illustrating another example 603 of a modulation selected from one or more modulations. This example 603 shows three group of bits partitioned into bit labels or symbols having many different numbers of bits (e.g., X4, X5, up to X6 bits per symbol or bit label). Those bit labels or symbols having X4 bits per symbol or bit label undergo symbol mapping using a first modulation. Those bit labels or symbols having X5 bits per symbol or bit label undergo symbol mapping using a second modulation, and so on up to those bit labels or symbols having X6 bits per symbol or bit label undergo symbol mapping using yet another modulation.

FIG. 6D is a diagram illustrating another example 604 of a modulation selected from one or more modulations. This example 604 shows three group of bits partitioned into bit labels or symbols having at least two different numbers of bits (e.g., X5 up to X6 bits per symbol or bit label). Those bit labels or symbols having X5 bits per symbol or bit label undergo symbol mapping using a second modulation, and so on up to those bit labels or symbols having X6 bits per symbol or bit label undergo symbol mapping using yet another modulation.

The values of X1, X2, X3, X4, X5, and X6 correspondent or any integer numbers. As can be seen, modulation symbols may be generated using any of a number of combinations of bit labels or symbols and modulations. Note also that the bits within different respective groups of bits need not necessarily be the same. Any desired combination may be performed. Considering an example of two groups of bits (e.g., X2 and X3 bits per symbol or bit label), the partitioning may be 50%/50%, 25%/75%, etc. or generally x and (1−x), where x is any desired fraction less than one. Analogously, for those implementations including more than two groups of bits, any desired partitioning may be performed within any desired distribution, with as few as a given group of bits having one bit label or symbol therein (e.g., a first group of bits with 1 symbol having X1 bits and a second group of bits with more than one symbol having X2 bits each).

In each of the following three diagrams, symbol mapper 520 is configured to generate modulation symbols using two or more modulations based on at least two different bit groups having different numbers of bits per symbol. These diagrams show different ways in which the modulation symbols may be arranged and provided from the symbol mapper 520 to the transmit driver (TX) 540.

FIG. 7A is a diagram illustrating an example 701 of a sequence of discrete-valued modulation symbols. Symbol mapper 520 is configured to generate first modulation symbols based on bit labels or symbols of A bits/symbol, where A is a first integer, and based on a first modulation and to generates second modulation symbols based on bit labels or symbols of B bits/symbol, where B is a second integer, and based on a second modulation. The first modulation symbols are preceded by the second modulation symbols when provided from the symbol mapper 520 to the transmit driver (TX) 540. In other words, the second modulation symbols are provided in a continuous stream followed by the first modulation symbols that are provided in a continuous stream.

FIG. 7B is a diagram illustrating an example 702 of a sequence of discrete-valued modulation symbols. Symbol mapper 520 is configured to generate first modulation symbols based on bit labels or symbols of A bits/symbol, where A is a first integer, and based on a first modulation and to generates second modulation symbols based on bit labels or symbols of B bits/symbol, where B is a second integer, and based on a second modulation. In this example 702, the first and second modulation symbols are interspersed amongst one another when provided from the symbol mapper 520 to the transmit driver (TX) 540. The pattern by which the modulation symbols are interspersed based on any desired pattern, such as a predetermined or known pattern, or the pattern may be selected or determine adaptively based upon any desired criteria. That is to say, different interspersing and intermingling of the first modulation symbols and the second modulation symbols may be made at different times. Generally, the first modulation symbols and the second modulation symbols need not be provided contiguously one after another.

FIG. 7C is a diagram illustrating an example 703 of a sequence of discrete-valued modulation symbols. Symbol mapper 520 is configured to generate first modulation symbols based on bit labels or symbols of A bits/symbol, where A is a first integer, and based on a first modulation and to generates second modulation symbols based on bit labels or symbols of B bits/symbol, where B is a second integer, and based on a second modulation. One or more additional modulations are employed as well, in that, Symbol mapper 520 is configured to generate third modulation symbols based on bit labels or symbols of C bits/symbol, where C is a first integer, and based on an x-th modulation.

In this example 703, the first, second, and third modulation symbols are interspersed based on any desired pattern. In an alternative to this example 703, the first modulation symbols may be followed by the second modulation symbols that may be followed by the third modulation symbols when provided from the symbol mapper 520 to the transmit driver (TX) 540. Any desired pattern of interspersing or intermingling of the various first, second, and third modulation symbols.

FIG. 8A is a diagram illustrating an embodiment of a method 801 for execution by one or more communication devices. The method 801 operates my encoding information bits to generate coded bits (block 810). The method 801 then operates by symbol mapping the coded bits to a blended modulation to generate modulation symbols (block 820). The blended modulation may be viewed as symbol mapping a first subset of coded bits using a first modulation and a second subset of coded bits using a second modulation to generate the modulation symbols. The first subset of coded bits may include bit labels or symbols having a first number of bits per symbol, and the second subset of coded bits may include bit labels or symbols having a second number of bits per symbol.

The method 801 then continues by generating a transmit signal based on the modulation symbols (block 830). The operations of the block 830 may be performed based on a combination of baseband processing and AFE processing to generate a signal for transmission based on the modulation symbols. For example, a processor within a communication device may generate a frame, such as an orthogonal frequency division multiplexing (OFDM) frame, using baseband processing operations, and a communication interface within the communication device may process that frame to generate a continuous-time signal for transmission from one communication device to one or more other communication devices via one or more to communication channels. The method 801 then operates by transmitting that continuous-time signal to the one or more other communication devices via the one or more communication channels using a communication interface of the communication device (block 840).

FIG. 8B is a diagram illustrating another embodiment of a method 802 for execution by one or more communication devices. The method 802 operates based on a first blended modulation (block 811). The method 802 then operates by monitoring for any change in one or more operational conditions (block 821).

The method 802 then determines whether or not any change has been detected (decision block 831). When no change in operational condition has been detected, the method 802 may terminate. Alternatively, the method 802 may continue to perform monitoring for any change in one or more operational conditions (block 821).

However, when the method 802 operates by detecting a change in operational condition, the method 802 operates based on a second blended modulation (block 841). The method 802 shows how adaptation between at least two different modulations may be performed based on a change of in operational condition. Such an operational condition may be based on any of a number of considerations including a local operating characteristic of a communication device, a remote operating characteristic of another device or communication link, etc.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments of an invention have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The one or more embodiments are used herein to illustrate one or more aspects, one or more features, one or more concepts, and/or one or more examples of the invention. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module includes a processing module, a processor, a functional block, hardware, and/or memory that stores operational instructions for performing one or more functions as may be described herein. Note that, if the module is implemented via hardware, the hardware may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure of an invention is not limited by the particular examples disclosed herein and expressly incorporates these other combinations.

What is claimed is:

1. A communication device comprising:
a communication interface; and
a processor, the processor and the communication interface configured to:
perform symbol mapping of bits to generate modulation symbols using a blended modulation selected from a plurality of blended modulations that are spaced by substantially uniform steps of bits per symbol and energy per bit or symbol to noise spectral density ratio ($E_b/N_0$ or $E_s/N_0$), wherein the blended modulation is a combination of two or more modulations; and transmit a signal based on the modulation symbols to another communication device via a communication channel.

2. The communication device of claim 1 further comprising:

the processor configured to:

generate a first symbol and a second symbol from the bits;

perform symbol mapping of the first symbol based on a first constellation to generate a first one of the modulation symbols based on the blended modulation; and perform symbol mapping of the second symbol, which includes a different number of bits than the first symbol, based on a second constellation, which includes a different number of constellation points than the first constellation, to generate a second one of the modulation symbols based on the blended modulation.

3. The communication device of claim 1 further comprising:

the processor configured to encode information bits using a forward error correction (FEC) code selected from a plurality of FECs to generate the bits, wherein the FEC selected from the plurality of FECs has a first code rate, and another FEC of the plurality of FECs has a second code rate that is different than the first code rate.

4. The communication device of claim 1 further comprising:

the processor configured to:

encode first information bits using a first forward error correction (FEC) code to generate the bits;

encode second information bits using a second FEC code to generate other bits;

perform symbol mapping of the bits to generate the modulation symbols based using blended modulation selected from the plurality of blended modulations based on a first bits per symbol; and perform symbol mapping of the other bits to generate other modulation symbols using another blended modulation selected from the plurality of blended modulations based on a second bits per symbol.

5. The communication device of claim 1 further comprising:

the processor configured to:

perform symbol mapping of the bits to generate the modulation symbols based on the blended modulation selected from the plurality of blended modulations based on a first bits per symbol; and perform symbol mapping of other bits to generate other modulation symbols based on another blended modulation selected from the plurality of blended modulations based on a second bits per symbol.

6. The communication device of claim 1 further comprising:

the processor and the communication interface configured to:

generate first symbols and second symbols from the bits;

perform symbol mapping of the first symbols based on a first constellation to generate a first subset of the modulation symbols; and perform symbol mapping of the second symbols, which include a different number of bits than the first symbols, based on a second constellation, which includes a different number of constellation points than the first constellation, to generate a second subset of the modulation symbols;

generate third symbols and fourth symbols from other bits;

perform symbol mapping of the third symbols based on the first constellation to generate a first subset of other modulation symbols;

perform symbol mapping of the fourth symbols, which include a different number of bits than at least one of the first or second symbols, based on a third constellation, which includes a different number of constellation points than at least one of the first or second constellations, to generate a second subset of the other modulation symbols; and transmit another signal based on the other modulation symbols to the another communication device via the communication channel.

7. The communication device of claim 1 further comprising:

the processor and the communication interface configured to:

receive a control signal from the another communication device;

transmit another signal based on other modulation symbols to the another communication device via the communication channel; and perform symbol mapping of other bits to generate the other modulation symbols using another blended modulation selected from the plurality of blended modulations based on the control signal.

8. The communication device of claim 1 further comprising:

a cable modem, wherein the another communication device is a cable headend transmitter or a cable modem termination system (CMTS).

9. The communication device of claim 1 further comprising:

the communication interface configured to support communications within at least one of a satellite communication system, a wireless communication system, a wired communication system, a fiber-optic communication system, or a mobile communication system.

10. A communication device comprising:

a communication interface; and a processor, the processor and the communication interface configured to:

perform symbol mapping of first bits using a first blended modulation of a plurality of blended modulations to generate first modulation symbols, wherein the first blended modulation includes a first and a second constellation;

perform symbol mapping of second bits using a second blended modulation of the plurality of modulations to generate second modulation symbols based on a control signal from another communication device, wherein the second blended modulation includes a third constellation and at least one of the first or second constellations, and the plurality of blended modulations are spaced by substantially uniform steps of bits per symbol and energy per bit or symbol to noise spectral density ratio ($E_b/N_0$ or $E_s/N_0$);

transmit a first signal based on the first modulation symbols to the another communication device via a communication channel;

receive the control signal from the another communication device via the communication channel; and transmit a second signal based on the second modulation symbols to the another communication device via the communication channel.

11. The communication device of claim 10 further comprising:
the processor configured to:
generate first symbols having a first number of bits per symbols and second symbols having a second number of bits per symbols from the first bits;
perform symbol mapping of the first symbols using the first constellation and the second symbols using the second constellation to generate the first modulation symbols;
generate third symbols having the first number of bits per symbols and third symbols having a third number of bits per symbols from the second bits, wherein the third symbols include a different number of symbols than the first symbols; and
perform symbol mapping of the third symbols using the first constellation and the third symbols using the third constellation to generate the second modulation symbols.

12. The communication device of claim 10 further comprising:
the processor configured to:
encode first information bits using a forward error correction (FEC) code to generate the first bits; and
encode second information bits using the FEC code selected to generate the second bits.

13. The communication device of claim 10 further comprising:
a cable modem, wherein the another communication device is a cable headend transmitter or a cable modem termination system (CMTS).

14. The communication device of claim 10 further comprising:
the communication interface configured to support communications within at least one of a satellite communication system, a wireless communication system, a wired communication system, a fiber-optic communication system, or a mobile communication system.

15. A method for execution by a communication device, the method comprising:
symbol mapping bits to generate modulation symbols using a blended modulation selected from a plurality of blended modulations that are spaced by substantially uniform steps of bits per symbol and energy per bit or symbol to noise spectral density ratio ($E_b/N_0$ or $E_s/N_0$), wherein the blended modulation is a combination of two or more modulations; and
via a communication interface of the communication device, transmitting a signal based on the modulation symbols to another communication device via a communication channel.

16. The method of claim 15 further comprising:
generating a first symbol and a second symbol from the bits;
performing symbol mapping of the first symbol based on a first constellation to generate a first one of the modulation symbols based on the blended modulation; and
performing symbol mapping of the second symbol, which includes a different number of bits than the first symbol, based on a second constellation, which includes a different number of constellation points than the first constellation, to generate a second one of the modulation symbols based on the blended modulation.

17. The method of claim 15 further comprising:
encoding first information bits using a first forward error correction (FEC) code to generate the bits;
encoding second information bits using a second FEC code to generate other bits;
symbol mapping the bits to generate the modulation symbols based using blended modulation selected from the plurality of blended modulations based on a first bits per symbol; and
symbol mapping the other bits to generate other modulation symbols using another blended modulation selected from the plurality of blended modulations based on a second bits per symbol.

18. The method of claim 15 further comprising:
via the communication interface of the communication device:
receiving a control signal from the another communication device; and
transmitting another signal based on other modulation symbols to the another communication device via the communication channel; and
symbol mapping other bits to generate the other modulation symbols using another blended modulation selected from the plurality of blended modulations based on the control signal.

19. The method of claim 15, wherein the communication device is a cable modem, and the another communication device is a cable headend transmitter or a cable modem termination system (CMTS).

20. The method of claim 15 further comprising:
operating the communication interface of the communication device to support communications within at least one of a satellite communication system, a wireless communication system, a wired communication system, a fiber-optic communication system, or a mobile communication system.

* * * * *